(12) United States Patent
Stein et al.

(10) Patent No.: US 10,888,947 B2
(45) Date of Patent: Jan. 12, 2021

(54) WORKPIECE-BASED SETTING OF WELD PARAMETERS

(75) Inventors: Alan Edward Stein, Little Chute, WI (US); Stephen Paul Ferkel, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 13/485,653

(22) Filed: May 31, 2012

(65) Prior Publication Data

US 2012/0325792 A1 Dec. 27, 2012

Related U.S. Application Data

(60) Provisional application No. 61/501,651, filed on Jun. 27, 2011.

(51) Int. Cl.
*B23K 11/00* (2006.01)
*B23K 9/32* (2006.01)
*G01C 11/28* (2006.01)

(52) U.S. Cl.
CPC ............... *B23K 9/32* (2013.01); *G01C 11/28* (2013.01)

(58) Field of Classification Search
CPC .... B23K 9/095; B23K 9/0953; B23K 9/0956; B23K 9/32; G01C 11/28; G01C 1/00
USPC .............. 219/121.11, 124.22, 125.01, 125.1, 219/130.01, 148, 124.34, 130.1, 137 PS; 700/135
See application file for complete search history.

(56) References Cited

U.S. PATENT DOCUMENTS

| | | | |
|---|---|---|---|
| 652,303 | A | 6/1900 | Toye |
| 4,020,907 | A | 5/1977 | Luck |
| 4,484,059 | A | 11/1984 | Lillquist |
| 4,998,005 | A | 3/1991 | Rathi et al. |
| 5,500,512 | A | 3/1996 | Goldblatt |
| 5,651,903 | A * | 7/1997 | Shirk ........................ 219/121.64 |
| 6,002,104 | A | 12/1999 | Hsu |

(Continued)

FOREIGN PATENT DOCUMENTS

| | | |
|---|---|---|
| DE | 102007008598 A1 | 8/2008 |
| EP | 1445055 | 8/2004 |

(Continued)

OTHER PUBLICATIONS

International Search Report from PCT application No. PCT/US2012/043436 dated Oct. 24, 2012, 11 pgs.

*Primary Examiner* — Justin C Dodson
(74) *Attorney, Agent, or Firm* — McAndrews, Held & Malloy, Ltd.

(57) ABSTRACT

Various embodiments of welding systems that enable determination of suitable weld settings for a weld part are provided. In one embodiment, a welding system includes a weld part having at least one weld joint to be welded. The welding system also includes a visual acquisition system including an imaging device and being adapted to acquire a visual representation of the weld part and to convert the visual representation into a digital signal representative of the weld part features. The welding system further includes a part recognition system having processing circuitry and memory. The processing circuitry is adapted to receive the digital signal and to compare the digital signal to a database stored in the memory to identify the weld part, weld settings appropriate for welding the weld part, or both.

16 Claims, 4 Drawing Sheets

(56) References Cited

U.S. PATENT DOCUMENTS

| | | |
|---|---|---|
| 6,091,048 A | 7/2000 | Lanouette et al. |
| 6,096,994 A | 8/2000 | Handa et al. |
| 6,130,407 A | 10/2000 | Villafuerte |
| 6,242,711 B1 | 6/2001 | Cooper |
| 6,248,975 B1 | 6/2001 | Lanouette et al. |
| 6,267,291 B1 | 7/2001 | Blankenship et al. |
| 6,476,354 B1 | 11/2002 | Jank |
| 6,479,793 B1 | 11/2002 | Wittmann |
| 6,510,984 B2 | 1/2003 | Blankenship et al. |
| 6,515,251 B1 | 2/2003 | Wind |
| 6,536,660 B2 | 3/2003 | Blankenship et al. |
| 6,552,303 B1 | 4/2003 | Blankenship |
| 6,563,085 B2 | 5/2003 | Lanouette et al. |
| 6,583,386 B1 | 6/2003 | Ivkovich |
| 6,681,151 B1 * | 1/2004 | Weinzimmer ......... B25J 9/1697 219/121.85 |
| 6,700,097 B1 | 3/2004 | Hsu |
| 6,708,877 B2 | 3/2004 | Blankenship et al. |
| 6,710,299 B2 | 3/2004 | Blankenship et al. |
| 6,750,428 B2 | 6/2004 | Okamoto |
| 6,852,949 B2 | 2/2005 | Lanouette et al. |
| 7,032,814 B2 | 4/2006 | Blankenship |
| 7,089,337 B2 | 8/2006 | Senoo |
| 7,130,255 B2 | 10/2006 | Smith |
| 7,342,210 B2 | 3/2008 | Fergason |
| 7,501,613 B2 | 3/2009 | Fergason |
| 7,510,047 B2 | 3/2009 | Muto |
| 7,510,151 B2 | 3/2009 | Perez-Sanchez |
| 7,550,689 B2 | 6/2009 | Wech |
| 8,569,655 B2 * | 10/2013 | Cole ........................ 219/147 |
| 2004/0050905 A1 * | 3/2004 | Endo et al. ................. 228/101 |
| 2005/0002083 A1 | 1/2005 | Fergason |
| 2005/0007504 A1 | 1/2005 | Fergason |
| 2005/0007667 A1 | 1/2005 | Fergason |
| 2005/0017152 A1 | 1/2005 | Fergason |
| 2007/0023408 A1 * | 2/2007 | Yuk Man ............... 219/124.34 |
| 2007/0080149 A1 | 4/2007 | Albrecht et al. |
| 2007/0080152 A1 | 4/2007 | Albrecht et al. |
| 2007/0080153 A1 | 4/2007 | Albrecht et al. |
| 2007/0089215 A1 | 4/2007 | Biche |
| 2007/0158319 A1 | 7/2007 | Connally |
| 2007/0262065 A1 | 11/2007 | Peters |
| 2008/0061049 A1 * | 3/2008 | Albrecht ................. 219/137 R |
| 2009/0071949 A1 | 3/2009 | Harris |
| 2009/0152251 A1 | 6/2009 | Dantinne |
| 2009/0298024 A1 | 12/2009 | Batzler |
| 2010/0086003 A1 | 4/2010 | Pfitzner |
| 2010/0108654 A1 * | 5/2010 | Ulrich et al. ............... 219/130.5 |
| 2010/0217440 A1 * | 8/2010 | Lindell ........................ 700/275 |
| 2011/0011752 A1 | 5/2011 | Conrardy et al. |
| 2011/0117527 A1 * | 5/2011 | Conrardy et al. ............ 434/234 |
| 2012/0029994 A1 * | 2/2012 | Barkan et al. ............. 705/14.25 |
| 2018/0373225 A1 * | 12/2018 | Worthing, Jr. ....... B23K 9/1062 |

FOREIGN PATENT DOCUMENTS

| | | |
|---|---|---|
| EP | 1486283 A1 | 12/2004 |
| EP | 1683599 | 7/2006 |

* cited by examiner

WORKPIECE-BASED SETTING OF WELD PARAMETERS

CROSS REFERENCE TO RELATED APPLICATIONS

This application is a Non-Provisional Patent Application of U.S. Provisional Patent Application No. 61/501,651, entitled, "Workpiece-Based Setting of Weld Parameters", filed Jun. 27, 2011, which is herein incorporated by reference.

BACKGROUND

The invention relates generally to welding systems, and more particularly to welding systems that enable automatic or semi-automatic setting of weld parameters based on one or more features of a workpiece.

Welding is a process that has become increasingly ubiquitous in all industries. While such processes may be automated in certain contexts, a large number of applications continue to exist for manual welding operations performed by skilled welding technicians. Traditional process welding systems support a variety of processes, such as metal inert gas (MIG) welding, tungsten inert gas (TIG) welding, stick welding, and so forth, which may operate in different modes, such as constant current or constant voltage. These power sources provide conditioned power for the welding application, and features of this provided power are governed by one or more setting input by a welding operator. For example, welding processes and settings traditionally require a manual adjustment via an operator interface on or proximate to the welding power source. Many welding applications, such as welding of aerospace parts, require the operator to utilize a TIG process, typically for finer or more intricate welds. In some cases, setting up the welding power source for TIG or other intricate forms of welding a desired part may be time consuming and subject to variations from desired parameters, thus reducing the efficiency and accuracy of the welding process. Accordingly, there exists a need for systems and methods that enable accurate and efficient setup of welding power supplies for a given weld, particularly in environments where the welding operation is intricate and involves the correct setting of multiple parameters.

BRIEF DESCRIPTION

In one embodiment, a welding system is designed for welding a part in which at least one weld joint is to be made. The welding system includes a visual acquisition system having an imaging device being adapted to acquire a visual representation of the weld part and to convert the visual representation into a digital signal representative of the weld part features. The welding system also includes a part recognition system having processing circuitry and memory. The processing circuitry is adapted to receive the digital signal and to compare the digital signal to data stored in the memory to identify the weld part, weld settings appropriate for welding the weld part, or both.

In another embodiment, a welding system is designed to operate with a weld part and an identification tag disposed on the weld part. The identification tag encodes data corresponding to the weld part. An identification tag reader is adapted to scan the identification tag to read the encoded data and to convert the data into an electrical signal. A part recognition system includes processing circuitry adapted to receive the electrical signal and to compare the electrical signal to stored data to identify weld settings appropriate for welding the weld joint of the weld part.

In a further embodiment, a method for identifying weld settings includes acquiring a digital data derived from a visual image of a weld part, extracting one or more distinguishing features of the weld part from the digital data, comparing the one or more distinguishing features to stored data, determining weld settings appropriate for welding the weld part based on the comparison, and providing the weld settings to a welding power supply configured to weld the weld part.

DRAWINGS

These and other features, aspects, and advantages of the present invention will become better understood when the following detailed description is read with reference to the accompanying drawings in which like characters represent like parts throughout the drawings, wherein.

Figure 3:
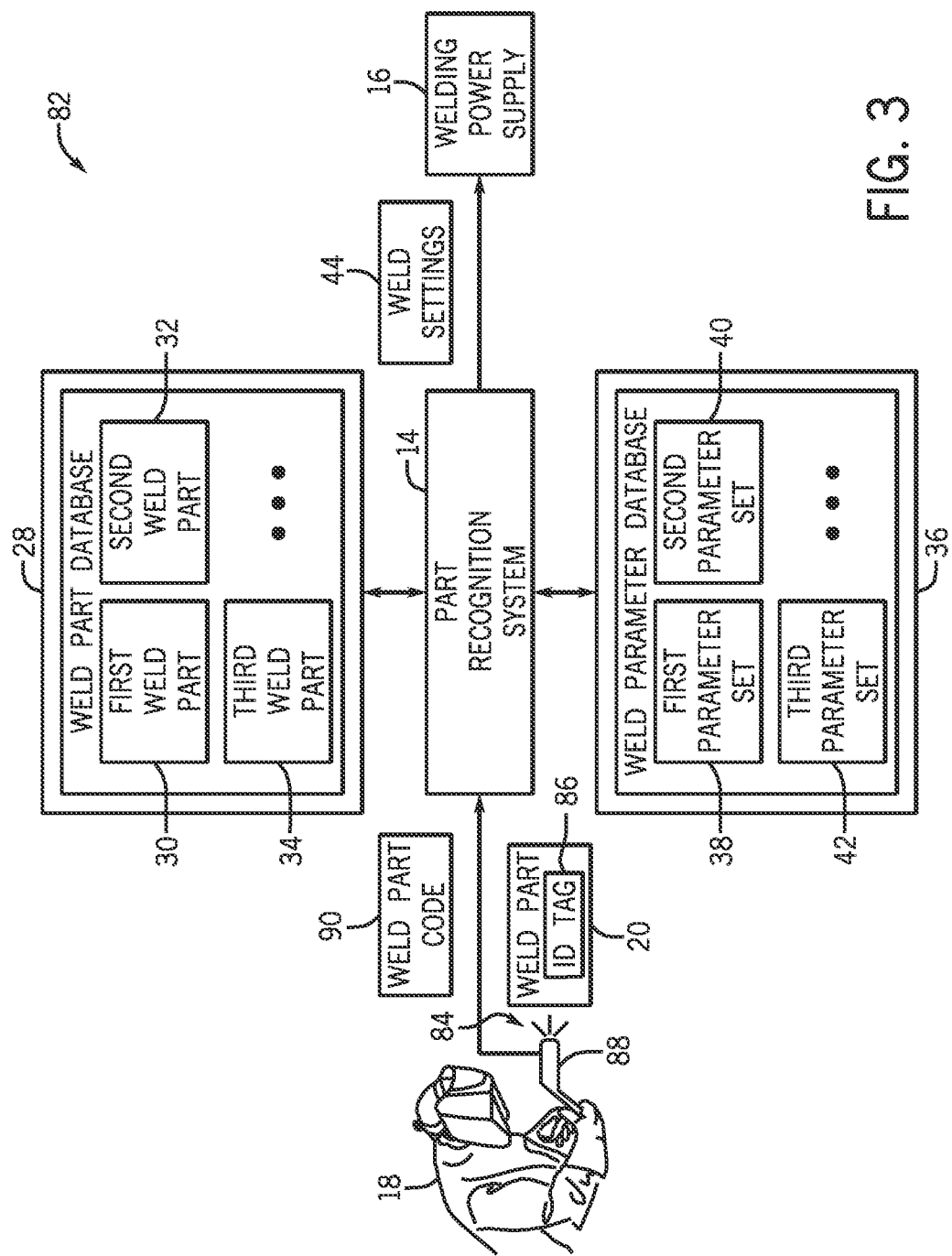
Figure 4:
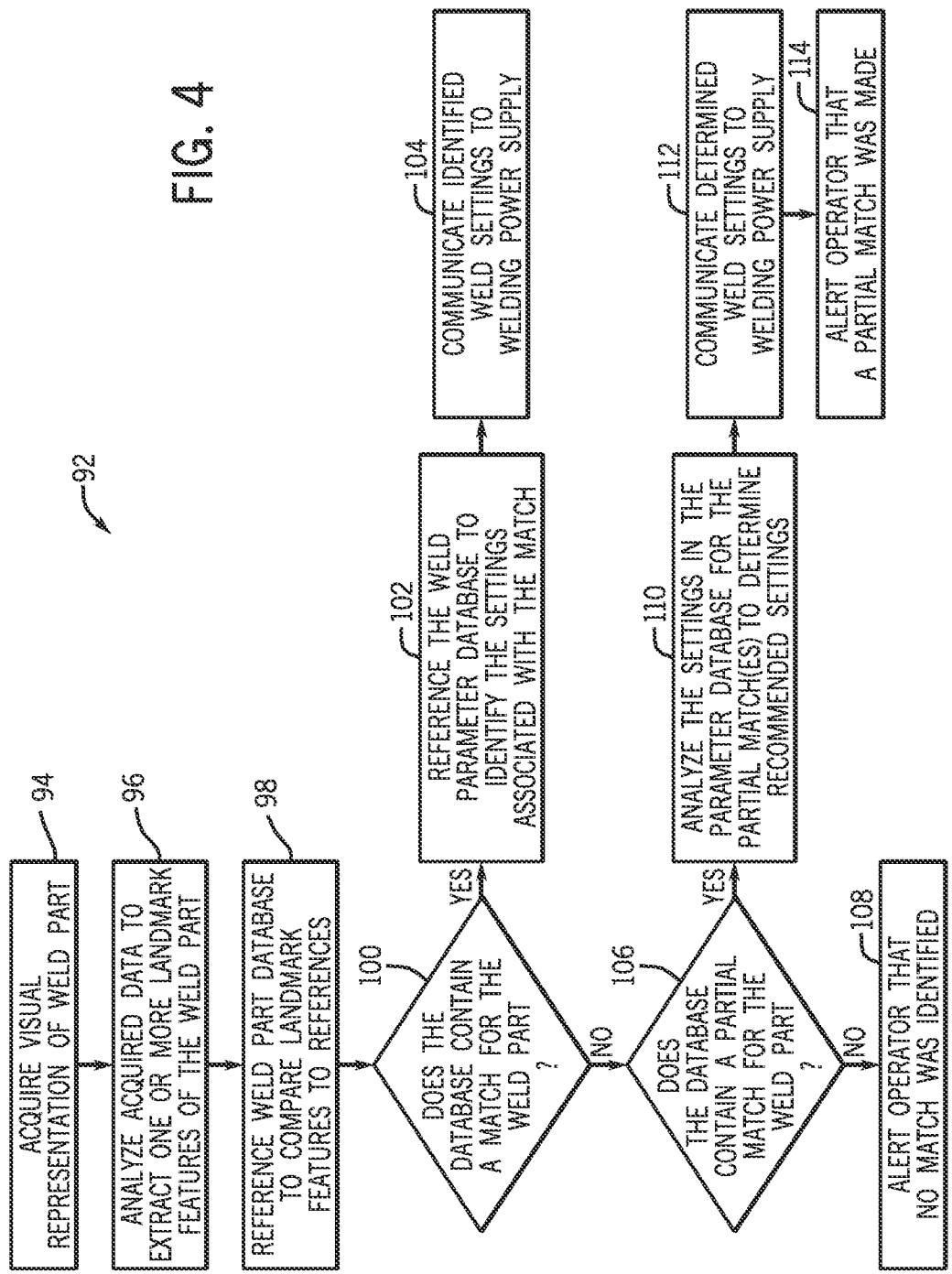

FIG. 3 is a diagrammatical illustration of an exemplary welding system having an identification system and a part recognition system capable of identifying weld settings appropriate for welding a weld part in accordance with disclosed embodiments; and FIG. 4 is a diagrammatical representation illustrating exemplary logic that may be utilized to identify weld settings appropriate for welding a weld part in accordance with a disclosed embodiment.

DETAILED DESCRIPTION

As discussed in detail below, various embodiments of welding systems and methods are disclosed that enable setting of weld parameters based on features of a weld part or workpiece. Some embodiments may include a visual acquisition system capable of obtaining a digital image of a weld part, converting the digital image into an electrical signal or data, and transmitting the signal or data to a part recognition system. In these embodiments, the part recognition system may evaluate the received electrical signal or data to extract one or more identifying features of the weld part from the acquired image data. Once identified, these features may be compared to one or more sets of data (which may be defined by code, stored in databases, and so froth) to identify weld settings appropriate for welding the imaged weld part. The foregoing features may enable a welding power supply to be automatically preloaded (or reset) with appropriate settings for welding a given part, thus reducing or eliminating the time necessary for a manual operator to spend to set up the welding power supply for welding the given part. This may be particularly advantageous for the setup of welding power supplies when performing intricate welds, such as welds performed utilizing tungsten inert gas (TIG) welding, although presently disclosed embodiments are compatible with a variety of suitable welding processes, such as metal inert gas (MIG) welding, stick welding, and so forth, or any particular welding process or regime. Furthermore, it should be noted that although the illustrated embodiments are described in the context of welding systems, the presently disclosed embodiments are also compatible with a variety of cutting and heating systems, such as plasma cutting systems. In these embodiments, the welding power supplies disclosed herein may be cutting or heating power supplies, and the weld parts may be parts to be cut or heated.

Figure 1:
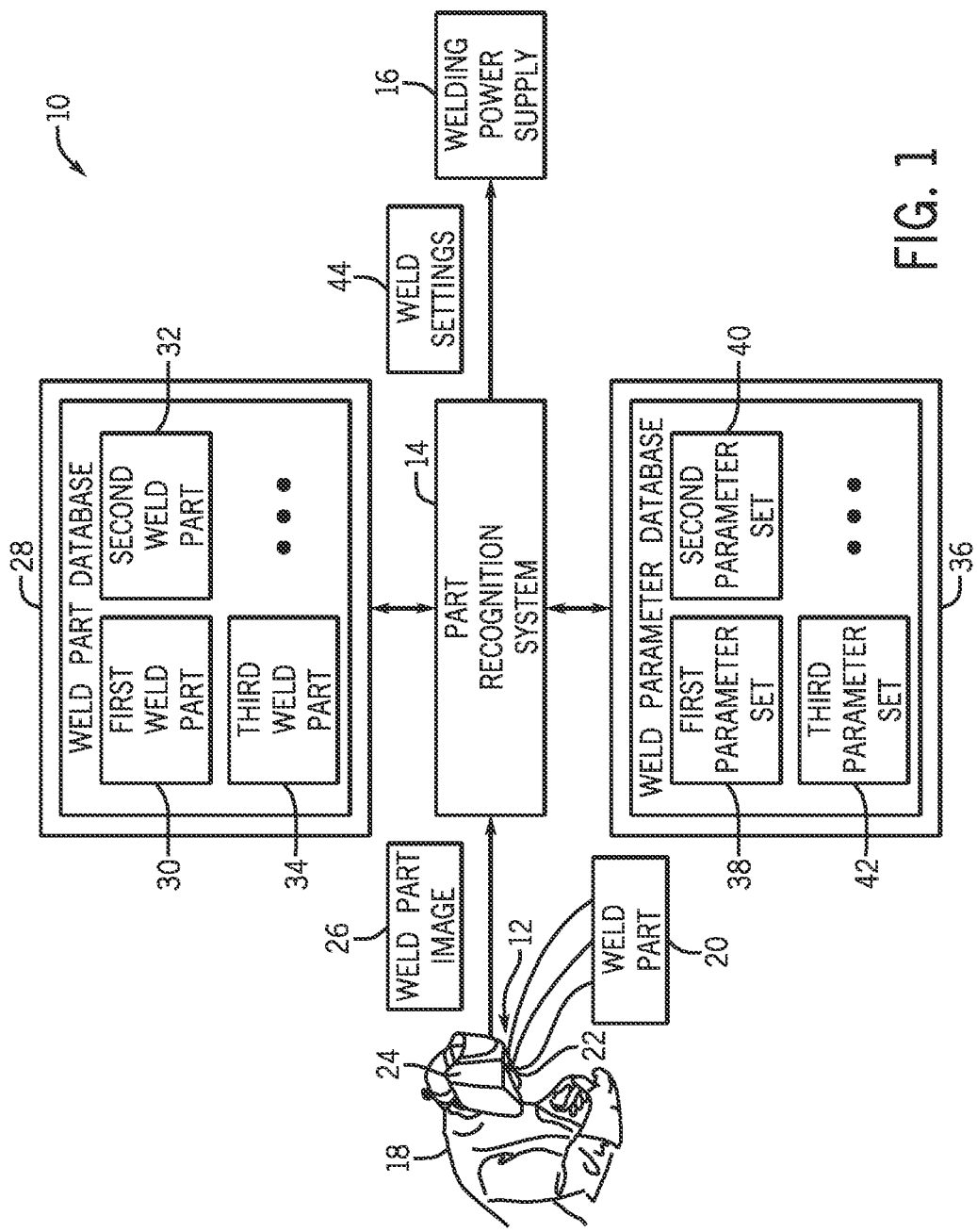
FIG. 1 is a diagrammatical illustration of a welding system having a visual acquisition system and a part recognition system capable of identifying weld settings appropriate for welding a weld part in accordance with disclosed embodiments.

Turning now to the drawings, FIG. 1 illustrates a welding system 10 having a visual acquisition system 12, a part recognition system 14, and a welding power supply 16. In the depicted embodiment, an operator 18 utilizes these systems to evaluate a weld part 20, which is the workpiece for a welding operation. In the illustrated embodiment, the visual acquisition system 12 includes an imaging device 22 (e.g., a camera) positioned in or on a welding helmet 24 worn by the welder 18. The field of view of the imaging device 22 is designed to encompass at least the area where the weld part 20 is located, which may include both the weld part and a portion of the surrounding environment. In certain embodiments, this field of view may overlap partially or entirely with the field of view of the operator 18 when viewing the weld part 20 through a lens of the helmet 24. However, it should be noted that in other embodiments, the visual acquisition system 12 may be mounted in other locations on the welding helmet 24 or may not be mounted in welding headgear. For example, the visual acquisition system 12 may be, more generally, a system capable of obtaining a digital image of the weld part 20. Such components may be positioned, for example, in desired locations on a fixture, in a weld cell, on a robot or automated welding setup, or could be desired for handheld utilization by the operator, and so forth.

During operation, the imaging device 22 is activated to acquire a digital image 26 of the weld part 20. The weld part image 26 is converted into a transmittable electrical signal or data by the visual acquisition system 12 and communicated to the part recognition system 14. The part recognition system 14, upon receiving this electrical signal or data that is representative of the weld part image 26, identifies one or more features of the weld part 20 and references data for determining appropriate welding system settings. For example, the reference data may be stored in a weld part database 28. The system matches the identified features to known weld parts 30, 32, and 34. Although only three known weld parts are shown, the weld part database 28 may include any quantity of known reference weld parts. It should also be noted that the database may be stored in the system itself or in any component or network device accessible by the system. Furthermore, the use of a database for storing the part definitions and associated settings may be implemented otherwise, such as via executed code that checks for matches between image-derived part data and known data for parts.

In some embodiments, the part recognition system 14 may identify a weld part match in the weld part database 28 and may further utilize this match to identify a set of weld parameters from a weld parameter database 36 that are suitable for use when welding the weld part 20. That is, the part recognition system 14 checks whether the first parameter set 38, the second parameter set 40, the third parameter set 42, or another parameter set contained within the weld parameter database 36 corresponds to the identified weld part match. Once identified, the part recognition system 14 communicates the suitable weld settings 44 contained in the identified parameter set to the welding power supply 16. In this way, the welding power supply 16 may be preloaded with or reset to automatically determined weld settings 44 that are appropriate for welding the weld part 20. Here again, the methodology for identification of part matches and associated settings may be performed otherwise, such as by code that sequentially checks for matches between the image-derived part data and predefined part data.

Communication between the visual acquisition system 12, the part recognition system 14, and the welding power supply 16 illustrated in FIG. 1 is depicted to occur over wired connections. It should be noted, however, that the presently disclosed embodiments are not limited to this or any particular mode of communication. Indeed, the illustrated systems may communicate via wired connections, wireless protocols, removable memory, a combination thereof, or any other suitable communication protocol.

Figure 2:
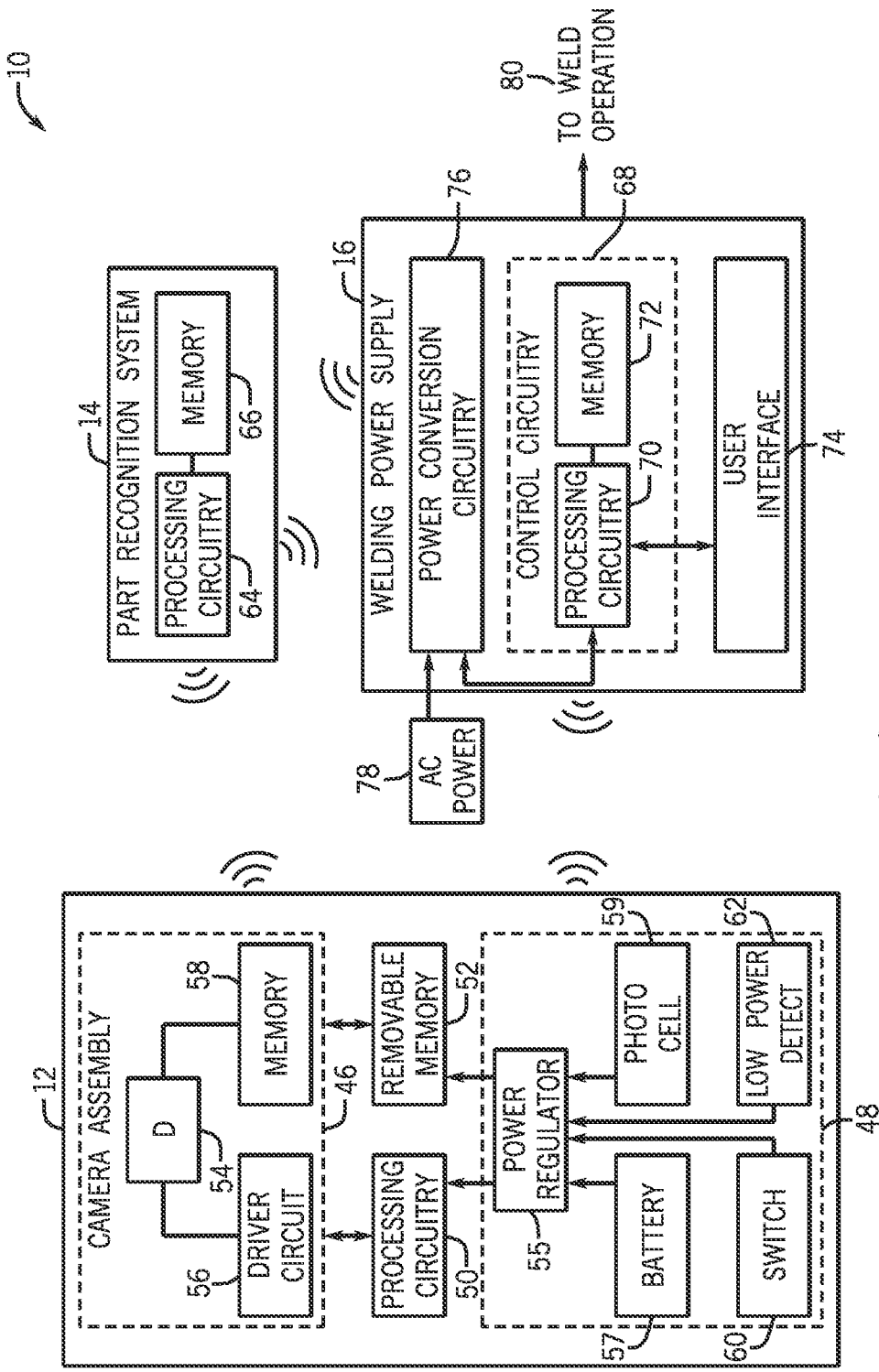
FIG. 2 is a diagrammatical representation of certain exemplary components of the welding system of FIG. 1 capable of communicating to set weld parameters suitable for a welding operation in accordance with a disclosed embodiment.

FIG. 2 illustrates examples of components that may be included in the visual acquisition system 12, the part recognition system 14, and the welding power supply 16 of FIG. 1 in exemplary embodiments. The visual acquisition system 12 includes a camera assembly 46 and a power supply 48 that interface with processing circuitry 50 and memory 52. The camera assembly 46 includes a digital detector 54 (e.g., a CCD, CMOS circuit, etc.), a driver circuit 56, and memory 58. The detector 54, captures video or still images and converts them to electrical signals or data. Driver circuit 56 is provided for generating drive signals for operation of the camera. Camera memory 58 may be the primary means of storing certain information, particularly camera settings, recording settings, and so forth. As noted above, the camera assembly 46 may be a pre-packaged unit capable of being added to the helmet 24 or another weld device or may be configured as a standalone unit.

The camera assembly 46 interfaces with both the processing circuitry 50 and/or memory 52. It should be noted that the processing circuitry 50 will typically either include its own memory, or may be associated with memory, such as for storing algorithms and instructions executed by the processing circuitry during operation, as well as image data on which the processing is performed. The processing circuitry 50 may communicate with the camera assembly 46 to set camera parameters such as exposure time and gain (e.g., sensitivity). Furthermore, it may perform image processing algorithms and may compress the acquired image of the weld part into a standard format. In certain embodiments, the processing circuitry 50 may store the acquired images of the weld part on the memory 52, which may be a USB flash drive, SD card, etc. In some embodiments, the processing circuitry 50 may also receive and process information originating from components external to the visual acquisition system 12, such as inputs from the part recognition system 14 and/or the welding power supply 16.

The power supply 48 provides power for the components of the visual acquisition system 12, and may include a central power regulator 55 that receives power from a battery 57 and/or photovoltaic cells 59, a switch 60, and a low power detector 62. The power regulator 55 may consist of one or more DC-DC voltage regulators that convert battery power and/or light energy into power levels that the visual acquisition system 12 can use and supplies the camera assembly 46 with power. The battery 57 may be but is not limited to lithium-ion, lithium-polymer, AA, or coin style batteries that may be rechargeable or non-rechargeable. The switch 60 enables the user to manually power the system off or on. In certain embodiments, a passive switch, such as a toggle switch or push button, may be used. In other embodiments, an active switch, such as a touch or voice sensor, may be chosen instead or in addition to the manual switch. The low power detector 62 indicates when the device needs to be recharged or the batteries need to be replaced. In certain embodiments, it may consist of a low-battery monitor or a comparator used with a constant voltage reference. In some embodiments, an indicator, such as an LED, may alert the user through flashing or other means that the battery needs to be recharged or replaced.

The processing circuitry 50 of the visual acquisition system 12 may interface with other system components to transmit and receive signals to coordinate operation of the welding system 10. For example, the processing circuitry 50 may wirelessly communicate with processing circuitry 64 of the part recognition system 14. For further example, the processing circuitry 50 may generate electrical signals or data corresponding to an image of the weld part acquired on the detector 54 and may transmit this electrical signal to the processing circuitry 64 of the part recognition system 14. The processing circuitry 64 of the part recognition system 14 may then reference memory 66 to identify appropriate weld settings for welding the given weld part. That is, as previously described, the processing circuitry 64 may reference one or more databases to identify suitable weld settings for the weld part based on one or more features of the weld part. Once the appropriate weld settings are determined, these settings are communicated from the part recognition system 14 to the welding power supply 16. A number of analysis and processing techniques may be utilized for the part recognition phase of this operation, such as edge detection, contrast analysis, scaling, rotation, as well as known sophisticated image data registration and recognition techniques, depending, for example, upon the complexity of the part, the quality of the captured image data, the number of parts to be distinguished, and so forth.

The welding power supply 16 includes control circuitry 68 having processing circuitry 70 and associated memory 72 and being adapted to receive the transmitted weld settings. The memory 72 may include volatile or non-volatile memory, such as read only memory (ROM), random access memory (RAM), magnetic storage memory, optical storage memory, or a combination thereof. Furthermore, a variety of control parameters may be stored in the memory along with code configured to provide a specific output (e.g., initiate wire feed, enable gas flow, establish the received weld settings, etc.) during operation of the welding system. The welding power supply 16 also includes a user interface, through which the welding operator may accept or alter the preloaded weld settings. Further, the user interface 74 located on the power supply 16 may enable a user to set the desired process (e.g., set constant current, constant voltage, or regulated metal deposition), set the polarity (e.g., set direct current electrode negative (DCEN) or direct current electrode positive (DCEP)), enable or disable a wire feed, enable or disable gas flow, and so forth.

Additionally, the welding power supply 16 also includes power conversion circuitry 76 that is configured to receive primary power, for example, alternating current (AC) power 78, and to convert the primary power to an output suitable for use in a welding operation 80. The power applied to the power conversion circuitry 76 may originate in a power grid, although other sources of power may also be used, such as power generated by an engine-driven generator, batteries, fuel cells or other alternative sources. Further, various power conversion circuits may be employed, including choppers, boost circuitry, buck circuitry, inverters, converters, and so forth.

FIG. 3 illustrates an embodiment of a welding system 82 including an identification system 84, a part recognition system 14, and a welding power supply 16. In this embodiment, the identification system 84 is configured to obtain information regarding the weld part 20 from an identification tag 86 disposed thereon, or in any way associated with the part (e.g., on a work order, a process sheet, and so forth). To that end, a tag reader 88 is utilized by the welding operator 18 to read the identification tag 86. In particular embodiments, the identification tag 86 may include a bar code corresponding to the weld part 20 and/or features of the weld joint to be welded, and the tag reader 88 may be a bar code reader. Once the identification tag 86 is read, the identification system 84 communicates the code 90 from the identification tag 86 of the weld part to the part recognition system 14. Other tagging technologies may, of course, be employed, such as radiofrequency identification technologies.

The part recognition system 14 utilizes the weld part code 90 to identify a reference weld part (e.g., first weld part 30, second weld part 32, or third weld part 34) in the weld part database 28 (or via code) that corresponds to the weld part 20. Once identified, the part recognition system 14 utilizes the weld parameter database 36 to identify a suitable parameter set containing weld settings appropriate for welding the weld part 20. As before, the part recognition system 14 may then communicate these settings to the welding power supply 16 to facilitate the proper setup of the welding power supply 16 for welding of the weld part 20. Again, the foregoing feature may reduce the amount of time necessary for the welding operator 18 to properly configure the welding power supply for welding the weld part 20.

FIG. 4 is illustrates exemplary logic in a method 92 that may be utilized to identify weld settings appropriate for welding a weld part in accordance with a disclosed embodiment. The method 92 includes acquiring a visual representation of the weld part (block 94) and analyzing the acquired data to extract one or more landmark features characteristic of the weld part (block 96). For example, a camera may be utilized to acquire the image, and processing circuitry may then process the image to identify characteristic features of the weld part, such as the size or shape of the part. Once the characteristic features have been identified, the method 92 includes referencing the weld part database (or executed code) to compare the landmark features of the weld part to those of the reference parts (block 98).

The method 92 further includes checking whether the database contains a matching part that corresponds to the weld part (block 100). That is, a controller or processor attempts to match the characteristic features of the unknown weld part to characteristic features of a known weld part. In some embodiments, a known weld part may be considered a match for an unknown weld part if the differences between the characteristics features of each part are below a preset threshold. For example, in one embodiment, if the unknown part matches approximately 95% or more of the features of a known part, the known and unknown part may be designated as a match. Depending on the application and operational mode, this threshold may be predetermined by a welding operator or automatically set by the controller.

If the part database does include a match for the unknown part, the weld parameter database is referenced to identify the weld settings that are appropriate for welding the known part that corresponds to the unknown part (block 102). Since the known part and the unknown part are a match, the weld settings identified for the known part may also be appropriate for welding of the unknown part. Accordingly, once identified, these settings are communicated to the welding power supply (block 104), and the welding power supply is set up for welding of the weld part. As previously mentioned, in certain embodiments, the welding operator may alter one or more of these settings if desired before welding. Nevertheless, in instances in which a match is identified, the foregoing features may substantially reduce the setup time typically expended by the welding operator.

If the part database does not include a match that is within the preset threshold, the weld part database is referenced to determine if a partial match can be identified (block 106). For example, in some embodiments, if the unknown part matches approximately 75% or more of the features of a known part, the known and unknown part may be designated as a partial match. Again, as before, the threshold for determination of a partial match may be preprogrammed into the control logic or may be set by an operator for each welding application. If a partial match is not identified, the operator is alerted that the weld part database does not include a match for the unknown weld part (block 108).

In some instances, the weld part database may include more than one known part that qualifies as a partial match based on the preset threshold. In these cases, the settings for each of the identified partial matches are located in the weld parameter database and analyzed for similarities and differences (block 110). In this way, the controller may identify a weld parameter set by comparing the weld parameter sets for each of the partial matches. In instances in which the identified parameter sets call for different settings for the same parameter, the controller may provide the operator with a choice between settings, automatically determine the setting, provide the operator an average of the two values, or may prompt the user for feedback. Once an appropriate set of weld parameters has been determined, however, the weld settings are communicated to the welding power supply (block 112), and the operator is alerted that a partial match was made (block 114), thus prompting the user to verify the settings before beginning to weld the weld part.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system, comprising:
  a visual acquisition system comprising an imaging device configured to acquire a visual representation of a workpiece and to convert the visual representation into data representative of the visual representation; and
  a workpiece recognition component comprising processing circuitry configured to:
    identify one or more characteristic geometric features of the workpiece based on the data;
    compare the one or more characteristic geometric features of the workpiece to a plurality of known workpieces stored in a first database to match the workpiece to a matching known workpiece of the plurality of known workpieces stored in the first database;
    when partial matches are identified between the workpiece and two or more of the plurality of known workpieces, identify weld settings stored in a second database associated with the two or more of the plurality of known workpieces stored in the first database;
    determine a weld parameter set based on the weld settings associated with the two or more of the plurality of known workpieces; and
    send the weld parameter set to a welding power supply.

2. The welding system of claim 1, comprising the welding power supply configured to communicate with the workpiece recognition component to receive the weld parameter set and to alter setup of the welding power supply to implement the weld parameter set prior to initiation of a weld operation.

3. The welding system of claim 1, wherein the visual acquisition system is disposed in or on a welding helmet configured to be worn by a welding operator.

4. The welding system of claim 1, wherein the imaging device comprises a digital camera configured to capture the visual representation and to convert the visual representation to the data.

5. The welding system of claim 1, wherein the visual acquisition system comprises a power source and a power regulator configured to cooperate to supply power to the imaging device.

6. The welding system of claim 1, wherein the workpiece recognition component is configured to distinguish between multiple workpieces having respective associated weld settings based on one or more visual representations of the multiple workpieces and respective characteristic geometric features of the multiple workpieces.

7. The welding system of claim 1, wherein the weld settings include selection of an appropriate welding process or regime.

8. A method for identifying weld settings, comprising:
  acquiring data representative of a visual image of a workpiece;
  extracting one or more characteristic geometric features of the workpiece from the data;
  comparing the one or more characteristic geometric features to a plurality of known workpieces stored in a first database to match the workpiece to a matching known workpiece of the plurality of known workpieces;
  when partial matches are identified between the workpiece and two or more of the plurality of known workpieces, determining a weld parameter set for welding the workpiece based on weld settings suitable for welding the two or more of the plurality of known workpieces, wherein the weld settings are stored in a second database; and
  communicating the weld parameter set to a welding power supply.

9. The method of claim 8, wherein determining the weld parameter set for welding the workpiece comprises referencing the second database based on the one or more characteristic geometric features.

10. The method of claim 8, wherein the one or more characteristic geometric features comprise a workpiece shape, a workpiece size, a distance between two features of the workpiece, or a combination thereof.

11. The method of claim 8, wherein acquiring the data comprises imaging the workpiece with a camera disposed in a welding helmet.

12. The method of claim 8, comprising alerting a welding operator when at least one of the characteristic geometric features of the workpiece is outside of an allowed tolerance when quantitatively compared to the plurality of known workpieces.

13. The method of claim 8, wherein the weld parameter set suitable for welding the workpiece includes selection of an appropriate welding process or regime.

14. The welding system of claim 1, wherein the workpiece recognition component is configured to determine the weld parameter set by:
- comparing corresponding weld parameters of the weld settings for each of the two or more of the plurality of known workpieces; and
- in response to identifying a difference between the weld settings for one of the weld parameters, prompt an operator to select between the different weld settings.

15. The welding system of claim 1, wherein the workpiece recognition component is configured to determine the weld parameter set by:
- comparing corresponding weld parameters of the weld settings for each of the two or more of the plurality of known workpieces; and
- in response to identifying a difference between the weld settings for one of the weld parameters, automatically determine the weld settings.

16. The welding system of claim 1, wherein the workpiece recognition component is configured to determine the weld parameter set by:
- comparing corresponding weld parameters of the weld settings for each of the two or more of the plurality of known workpieces; and
- in response to identifying a difference between the weld settings for one of the weld parameters, determine an average of the weld parameters based on the weld settings.

* * * * *